US012510406B2

(12) United States Patent
D'Aleo et al.

(10) Patent No.: US 12,510,406 B2
(45) Date of Patent: Dec. 30, 2025

(54) TEMPERATURE INDEPENDENT SPECTRAL SENSOR WITH VOLTAGE ADJUSTMENT

(71) Applicant: ams International AG, Jona (CH)

(72) Inventors: Francesco Paolo D'Aleo, Zurich (CH); Kotaro Ishizaki, Zurich (CH); Peter Roentgen, Thalwil (CH); Javier Miguel Sánchez, Zurich (CH)

(73) Assignee: AMS International AG, Jona (CH)

(*) Notice: Subject to any disclaimer, the term of this patent is extended or adjusted under 35 U.S.C. 154(b) by 0 days.

(21) Appl. No.: 17/763,741

(22) PCT Filed: Jun. 25, 2021

(86) PCT No.: PCT/EP2021/067547
§ 371 (c)(1),
(2) Date: Mar. 25, 2022

(87) PCT Pub. No.: WO2022/002798
PCT Pub. Date: Jan. 6, 2022

(65) Prior Publication Data
US 2022/0357200 A1 Nov. 10, 2022

(30) Foreign Application Priority Data

Jun. 30, 2020 (GB) .................................. 2009964

(51) Int. Cl.
G01J 3/02 (2006.01)
G01J 3/06 (2006.01)
G01J 3/26 (2006.01)

(52) U.S. Cl.
CPC ........... *G01J 3/0286* (2013.01); *G01J 3/0256* (2013.01); *G01J 3/06* (2013.01); *G01J 3/26* (2013.01)

(58) Field of Classification Search
CPC .......... G01J 3/0286; G01J 3/0256; G01J 3/06; G01J 3/26
See application file for complete search history.

(56) References Cited

U.S. PATENT DOCUMENTS

| 5,909,280 | A | 6/1999 | Zavracky |
| 7,239,001 | B2 * | 7/2007 | Pautet ....................... G01J 3/26 |
| | | | 257/431 |

(Continued)

FOREIGN PATENT DOCUMENTS

| CN | 105045292 A | 11/2015 | |
| CN | 105276769 A * | 1/2016 | .......... F24F 2110/00 |

(Continued)

OTHER PUBLICATIONS

Anonymous, "Fabry-Pérot interferometer" Wikipedia page. <https://en.wikipedia.org/wiki/Fabry%E2%80%93P%C3%A9rot_interferometer> webpage available at least as early as Sep. 28, 2009 (7 pages).

(Continued)

*Primary Examiner* — Tarifur R Chowdhury
*Assistant Examiner* — Kemaya Nguyen
(74) *Attorney, Agent, or Firm* — Michael Best & Friedrich LLP

(57) ABSTRACT

A spectral sensor comprising a Fabry-Perot interferometer having a pair of reflectors, a photodetector located beneath the Fabry-Perot interferometer, a capacitance measurement circuit configured to measure a capacitance of the Fabry-Perot interferometer, and a controller configured to control a voltage applied across the reflectors of the Fabry-Perot interferometer.

15 Claims, 3 Drawing Sheets

(56) References Cited

U.S. PATENT DOCUMENTS

| | | | |
|---|---|---|---|
| 10,732,035 B2* | 8/2020 | Fiore | G01J 3/0256 |
| 2002/0031160 A1* | 3/2002 | Desor | H01S 3/225 |
| | | | 372/57 |
| 2004/0086228 A1* | 5/2004 | Rumpf | G01D 5/268 |
| | | | 385/12 |
| 2007/0297741 A1* | 12/2007 | Linder | H01S 5/0607 |
| | | | 385/130 |
| 2010/0086672 A1* | 4/2010 | Von Drasek | D21F 11/14 |
| | | | 427/9 |
| 2010/0245832 A1 | 9/2010 | Saari | |
| 2014/0368825 A1* | 12/2014 | Rissanen | G01J 3/26 |
| | | | 356/519 |
| 2015/0318799 A1 | 11/2015 | Hirokubo | |
| 2016/0123809 A1 | 5/2016 | Learmonth et al. | |
| 2017/0350760 A1* | 12/2017 | Antila | G01J 3/26 |
| 2019/0265103 A1* | 8/2019 | Hirokubo | G01J 3/26 |
| 2021/0231907 A1* | 7/2021 | Park | G02B 13/0045 |

FOREIGN PATENT DOCUMENTS

| | | |
|---|---|---|
| CN | 107250740 A | 10/2017 |
| CN | 107430032 A | 12/2017 |
| CN | 110196490 A | 9/2019 |
| CN | 111183343 A | 5/2020 |
| EP | 2720014 A1 | 4/2014 |
| EP | 2746740 A2 | 6/2014 |
| EP | 3683557 A1 | 7/2020 |
| JP | H10221660 A * | 8/1998 |
| WO | 2013/059665 A1 | 4/2013 |

OTHER PUBLICATIONS

Saucedo-Flores, E., et al. "Study of the pull-in voltage for MEMS parallel plate capacitor actuators." MRS Online Proceedings Library (OPL) 782 (2003) (7 pages).

International Search Report for corresponding International Application No. PCT/EP2021/067547, dated Aug. 19, 2021.

United Kingdom Search Report for corresponding Application No. 2009964.4 dated Dec. 21, 2020.

Chinese Patent Office Action for Application No. 202180005999.7 dated Dec. 25, 2024 (17 pages including English translation).

Chinese Patent Office Action for Application No. 202180005999.7 dated May 30, 2024 (14 pages including English translation).

* cited by examiner

TEMPERATURE INDEPENDENT SPECTRAL SENSOR WITH VOLTAGE ADJUSTMENT

TECHNICAL FIELD

The present disclosure is in the field of spectral sensors.

BACKGROUND

Spectral sensors are well known and are used in a variety of application areas. Typically, a spectral sensor includes a photodetector, and an optical element which is used to select the wavelength of light incident upon the photodetector. The optical element may be adjusted gradually over time such that the wavelength of light incident upon the photodetector changes gradually over time. The photodetector thus provides as an output the intensity of light incident upon the photodetector as a function of wavelength. This may be referred to as an intensity spectrum. Conventionally, the optical element which is used to select the wavelength of light incident upon the photodetector is a prism or a diffraction grating.

A spectral sensor is also known in which the optical element is a tuneable Fabry-Perot interferometer. Fabry-Perot interferometers are well known and comprise a pair of reflective plates which are parallel and facing each other. Although reflective, the plates transmit a small amount of light. The wavelength of light which is transmitted by the Fabry-Perot interferometer is determined by the separation of the plates. In a conventional tuneable Fabry-Perot interferometer the separation of the plates is manually adjustable. In a MEMs implementation of a Fabry-Perot interferometer the transmission wavelength is adjusted by adjusting a voltage applied across plates of the Fabry-Perot interferometer. Increasing the voltage provides more charge to the plates and causes them to bend towards each other. This reduces the cavity transmission wavelength of the Fabry-Perot interferometer (i.e. reduces the wavelength at which light is transmitted by the Fabry-Perot interferometer). A spectral sensor with a MEMs implementation of a Fabry-Perot interferometer is more compact than a conventional spectral sensor which uses a prism or a diffraction grating.

However, the spectral sensor suffers from a disadvantage that the wavelength transmitted by the Fabry-Perot interferometer will change if the temperature of the spectral sensor changes (due to thermal expansion of the interferometer). In the prior art this problem is addressed during production of the spectral sensor by placing the spectral sensor in a temperature-controlled chamber, and then performing a sweep of temperatures across the full expected range of operating temperatures. The performance of the spectral sensor is recorded as a function of temperature in a lookup table in a memory which forms part of the spectral sensor. During subsequent use of the spectral sensor the lookup table is used to correct for the effect of temperature upon the operation of the spectral sensor.

A disadvantage of the above approach is that it is time consuming to sweep the temperature of the chamber, and this time consuming procedure must be performed for each sensor. In addition, the temperature-controlled chambers are expensive. Furthermore, they are bulky and occupy significant space at the production site.

It is therefore an aim of the present disclosure to address one or more of the problems above or at least to provide a useful alternative.

SUMMARY

In general terms, this disclosure proposes to use a capacitance measurement to determine a separation between reflectors of a Fabry-Perot interferometer of a spectral sensor, and thereby determine the wavelength of light which will be transmitted by the Fabry-Perot interferometer.

According to a first aspect of the disclosure there is provided a spectral sensor comprising a Fabry-Perot interferometer having a pair of reflectors, a photodetector located beneath the Fabry-Perot interferometer, a capacitance measurement circuit configured to measure a capacitance of the Fabry-Perot interferometer, and a controller configured to control a voltage applied across the reflectors of the Fabry-Perot interferometer.

The disclosed spectral sensor is advantageous because it does not require time consuming and expensive calibration over a range of temperatures during production of the sensor. Instead, the capacitance measurement is used to determine the separation of the reflectors of the Fabry-Perot interferometer when spectral measurements are being performed. For example, a capacitance measurement may be provided immediately before a spectral measurement is performed.

The reflectors may be conductors.

The reflectors may be multilayer structures.

The controller may be configured to receive the measured capacitance of the Fabry-Perot interferometer, and to use the measured capacitance to determine the voltage applied to the Fabry-Perot interferometer in order to transmit a desired wavelength.

The spectral sensor may further comprise a thermistor.

The Fabry-Perot interferometer may comprise a substrate provided with a recess having a planar bottom, and a layer which extends over the recess.

One reflector of the pair of reflectors may be provided on the planar bottom, and the other reflector is provided on a surface of the layer which faces the planar bottom.

The controller may be configured to receive a measured capacitance, modify the measured capacitance taking into account the measured temperature in order to provide a true capacitance, and then use the true capacitance to determine the voltage to be applied to the reflectors.

In an embodiment, the spectral sensor does not include a processor configured to perform post-measurement processing of measured intensity values to correct for temperature dependent effects.

According to a second aspect of the disclosure there is provided a spectrometer comprising the spectral sensor of the first aspect, and further comprising a light source.

According to a third aspect of the disclosure there is provided a method of spectral measurement using a Fabry-Perot interferometer which comprises a pair of reflectors, and a photodetector located beneath the Fabry-Perot interferometer, the method comprising measuring the capacitance of the Fabry-Perot interferometer, applying a voltage across the reflectors of the Fabry-Perot interferometer to select a separation of the reflectors which transmits a desired wavelength, the voltage being determined based upon the measured capacitance, and measuring the intensity of light incident upon the photodetector.

The method is advantageous because it does not require retrieval from a look up table of a previously determined calibration of wavelength transmission as a function of temperature (the calibration is time consuming and expensive).

The voltage may be scanned from a minimum desired voltage to a maximum desired voltage, or from a maximum desired voltage to a minimum desired voltage, in order to obtain measurements across a desired range of wavelengths.

The capacitance may be measured before each spectral measurement.

The capacitance may be measured after each spectral measurement.

The capacitance may be measured during each spectral measurement.

The capacitance may be measured after a predetermined time and/or after a predetermined change of temperature of the spectral sensor.

A temperature invariant constant of the capacitor formed by the Fabry-Perot interferometer may be stored in a memory of the spectral sensor and may be used when determining the voltage to apply across the reflectors of the Fabry-Perot interferometer.

The temperature invariant constant of the capacitor may be a value which has been measured for that spectral sensor following fabrication of the spectral sensor.

The temperature may be measured, and the measured capacitance modified taking into account the measured temperature in order to provide a true capacitance. The true capacitance may be used to select the separation of the reflectors.

In an embodiment, post-measurement processing of measured intensity values to correct for temperature dependent effects is not performed.

Features of different aspects of the invention may be combined together.

BRIEF DESCRIPTION OF THE DRAWINGS

These and other aspects of the present disclosure will now be described by way of example only, with reference to the accompanying drawings, in which.

DETAILED DESCRIPTION

As described above, the present disclosure provides a spectral sensor in which a capacitance measurement is used to determine the separation of reflectors of a Fabry-Perot interferometer which forms part of the spectral sensor. This advantageously avoids the need to perform a time consuming and costly calibration of the spectral sensor during production.

Figure 1:
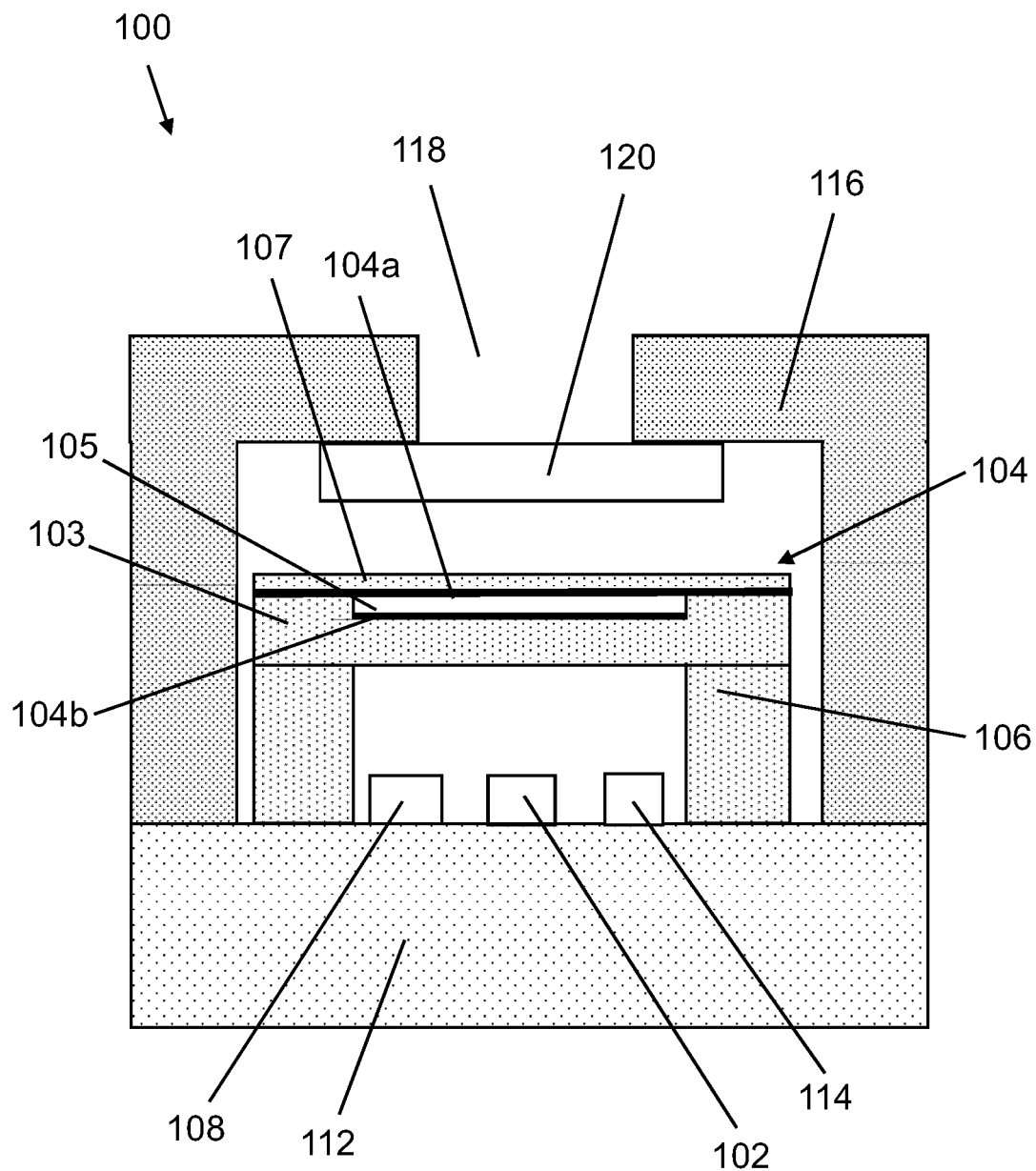
FIG. 1 schematically depicts a spectral sensor according to an embodiment of the disclosure.

FIG. 1 schematically depicts in cross-section a spectral sensor 100 according to an embodiment of the disclosure. The spectral sensor 100 comprises a photodetector 102 located beneath a Fabry-Perot interferometer 104. The photodetector 102 may for example be a photodiode.

The Fabry-Perot interferometer 104 comprises a substrate 103 (e.g. formed from silicon) provided with a recess 105 having a planar bottom. A layer 107 (e.g. formed from silicon, e.g. a silicon wafer) is supported on supports either side of the substrate 103 and extends across the recess 105. A lowermost surface of the silicon layer 105 is provided with a multilayer reflective structure 104a (e.g. formed from SiO and SiN layers). This may be referred to as a first reflector 104a. The planar surface of the recess 105 is also provided with a multilayer reflective structure 104b (e.g. formed from SiO and SiN layers). This may be referred to as a second reflector 104b. Thus, two reflectors 104a,b are provided which face each other. These reflectors 104a,b act as a pair of reflective plates 104a,b of the Fabry-Perot interferometer 104. The substrate 103 and reflectors 104a,b may be square (or rectangular) when viewed from above.

The substrate 103 is supported by two elongated pillars 106 (e.g. formed from silicon). The elongated pillars 106 run along two sides of the substrate 103. Other forms of support 106 may be used to support the substrate 103. The supports 106 and the substrate 103 may be formed from the same material (e.g. silicon).

Figure 2:
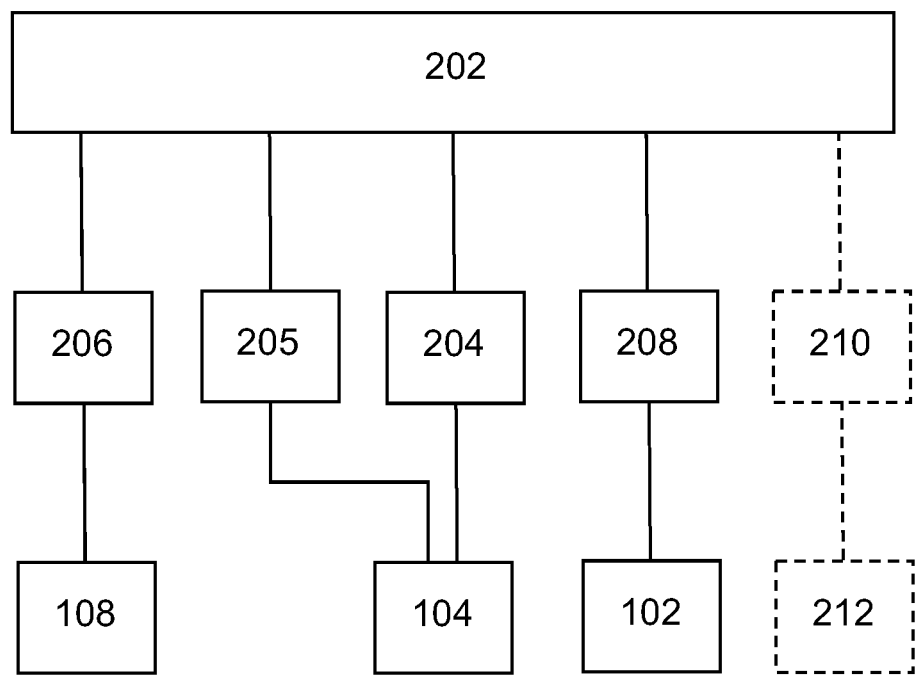
FIG. 2 is a control diagram which illustrates how the spectral sensor is controlled.

A thermistor 108 is located adjacent to the photodetector 102 and beneath the Fabry-Perot interferometer 104. The photodetector 102, thermistor 108 and supports 106 are all fixed to a substrate 112. The substrate 112 may for example be a printed circuit board (E.G. formed from FR4). Control electronics 114 are also provided. The control electronics 114 may comprise a processor, a memory and other components. An embodiment of the control electronics is depicted in FIG. 2 and is described further below. The control electronics 114 may be provided adjacent to the photodetector 102 and beneath the Fabry-Perot interferometer 104. The control electronics 114 may have some other position, such as beneath the substrate 112 or within the substrate.

A housing 116 extends over the photodetector 102, Fabry-Perot interferometer 104 and thermistor 108. The housing 116 may be formed from fiber metal filled liquid crystal polymer. An opening 118 is provided in the housing 116. The opening 118 is positioned above the Fabry-Perot interferometer 104. The photodiode 102 may be positioned directly below the opening 118. Advantageously this may provide a symmetric distribution of light onto the photodiode 102.

A window 120 is provided to close the opening 118 whilst allowing the transmission of light. The window 120 is provided beneath the opening 118. This minimizes the possibility of the window being damaged. The window 120 could however be provided above the opening 118. The window 120 seals shut a volume within which the Fabry-Perot interferometer 104 is provided. This controls the environment around the Fabry-Perot interferometer 104 (usually air). The window may be provided with a band-pass filter which limits the range of light wavelengths that are incident upon the Fabry-Perot interferometer 104.

As noted above, the Fabry-Perot interferometer 104 comprises a pair of reflectors 104a,b. The reflectors 104a,b have a reflectivity of more than 80%. The reflectivity of the reflectors 104a,b may for example be 85% or more. The reflectivity may be 99% or more (e.g. 99.9% or more). The Fabry-Perot interferometer 104 acts as a wavelength filter. The higher the reflectivity of reflectors 104a,b, the narrower the wavelength band which is transmitted by the Fabry-Perot interferometer 104.

Operation of the Fabry-Perot interferometer 104 may be understood as follows. Some of the light incident upon the first reflector 104a of the Fabry-Perot interferometer 104 will pass through the first reflector. The light will propagate to and be incident upon the second reflector 104b. Some of this light will be transmitted by the second reflector 104b and some will be reflected. The reflected light is then incident upon the first reflector 104a, and part of that light is again reflected. Multiple more partial transmissions and reflections of the light will occur. Consequently, light which has undergone different numbers of reflections is transmitted by the second reflector 104b.

For most wavelengths of light, destructive interference occurs when the light leaves the second reflector 104b, and light at those wavelengths is not seen by the photodetector 102. However, if the optical path length of the light in the Fabry-Perot interferometer 104 (i.e. passage across a gap between the reflectors 104a,b and back again) is an integer multiple of a wavelength of the light, then constructive interference of light at that wavelength occurs. That wavelength is transmitted by the Fabry-Perot interferometer and is seen by the photodetector 102. Thus, when light with a broad wavelength range is incident upon the Fabry-Perot interferometer 104, only light with a specific wavelength which is an integer multiple of 2× the reflector separation will be transmitted to the photodetector 102. Further details of operation of Fabry-Perot interferometers may be found for example at https://en.wikipedia.org/wiki/Fabry%E2%80%93P%C3%A9rot_interferometer The position and size of the opening 116 above the Fabry-Perot interferometer 104 may be selected such that only light incident over a predetermined range of angles of incidence can travel through the opening 116 to be incident upon the Fabry-Perot interferometer. This is advantageous because restricting the range of angles of incidence of light on the Fabry-Perot interferometer 104 means that the Fabry-Perot interferometer will transmit a desired wavelength more accurately (light incident at large oblique angles will be transmitted at longer wavelengths than normally incident light). The opening 116 may for example restrict angles of light incident upon the Fabry-Perot interferometer 104 to 15 degrees from the normal (or some other value).

The wavelength of light which is transmitted by the Fabry-Perot interferometer 104 may be adjusted by applying a voltage across the reflectors 104a,b (the reflectors may be conductive). Electrical connection to the reflectors 104a,b may be provided by wires (not depicted). The control electronics 114 may be used to control the voltage applied across the reflectors 104a,b via the wires. Increasing the voltage which is applied across the reflectors 104a,b attracts the reflectors 104a,b to each other and as a result the upper reflector 104a moves towards the lower reflector 104b. This reduces a gap 105 between the reflectors 104a,b and reduces the wavelength of light which is transmitted by the Fabry-Perot interferometer 104. Reducing the voltage applied across the reflectors 104a,b reduces the attraction of the reflectors to each other, and allows the upper reflector 104a to move away from the lower reflector 104b. This increases the wavelength of light which is transmitted by the Fabry-Perot interferometer 104. Movements of the upper reflector 104a by at little as 1 nm may be achieved.

Thus, the control electronics 114 can, by selecting a voltage applied across the reflectors 104a,b of the Fabry-Perot interferometer, select a wavelength to be transmitted by the Fabry-Perot interferometer 104. As will be appreciated, in order to be able to select the wavelength with accuracy, accurate control of the gap between the reflectors 104a,b is desirable. However, the temperature of the spectral sensor 100 will have an effect upon the gap (a higher temperature may increase the separation due to thermal expansion). In prior art systems a thermistor is used to measure the temperature, and a previously measured calibration lookup table is then used to determine the separation between the reflectors. However, this method is time consuming and expensive. In the present disclosure an alternative approach is used.

According to embodiments of the disclosure, the wavelength transmitted by the Fabry-Perot interferometer 104 may be selected by measuring the capacitance of the Fabry-Perot interferometer, and then using the measured capacitance to determine the voltage needed in order to achieve transmission of that wavelength. The method may take into account constant properties of the Fabry-Perot interferometer (i.e. properties which do not vary with temperature). The method may be based on use of the following equation:

$$V = \frac{B\lambda_{1/2}}{C} \quad (1)$$

where V is the voltage applied across the reflectors 104a,b of the Fabry-Perot interferometer 104, B is a temperature invariant constant of a capacitor formed by the reflectors, λ is the wavelength of light to be transmitted, and C is the capacitance of the capacitor formed by the reflectors. The reflectors may be thought of as plates of a parallel plate capacitor.

Advantageously, the method of the disclosure avoids the need to perform a time consuming and expensive calibration of the transmission of the Fabry-Perot etalon as a function of temperature during production of the spectral sensor. The measurement of capacitance may for example be performed immediately before a measurement of intensity over a wavelength range (i.e. a spectral measurement) is performed by the spectral sensor.

As is known, the charge Q on the capacitor formed by the reflectors 104a,b of the interferometer 104 is:

$$Q = CV \quad (1)$$

From combining equation 1 and equation 2, it may be seen that the wavelength of light which is transmitted by the Fabry-Perot interferometer 104 is proportional to the square of the charge Q on the capacitor formed by the reflectors 104a,b of the interferometer 104.

The following provides, from physical first principles, an explanation of why the wavelength which is transmitted by the Fabry-Perot interferometer 104 may be determined using a capacitance measurement:

The reflectors 104a,b of the Fabry-Perot interferometer 104 may be considered to be flat and are separated from each other by a gap. The reflectors 104a,b of the Fabry-Perot interferometer form a parallel plate capacitor. A voltage applied across the reflectors 104a,b causes opposite charge to flow to the reflectors, and the opposite charges attract the reflectors towards each other. The upper reflector 104a is provided on a silicon layer 107 with some flexibility (the layer may for example have a thickness of 1-5 microns). Thus, the upper reflector 104a has some flexibility and may bend towards the lower reflector 104b.

When the reflectors are not moving, i.e. they are in a state of equilibrium, a restoring spring force of each plate is equal to the electrostatic force of the charge on the membrane:

$$\vec{F}_s + \vec{F}_e = 0 \quad (3)$$

Only one dimension needs to be considered, that is a direction perpendicular to the planes of the reflectors. Expressing (3) in one dimension:

$$F_s + F_e = 0 \quad (4)$$

The spring force may be expressed as:

$$F_s = -kx \quad (5)$$

where k is Hooke's constant and x is displacement of the plate from its relaxed position (x being a direction perpendicular to the plane of the plate).

The force between the reflectors of a capacitor can be expressed as follows:

$$F_e = \frac{\varepsilon_0 \varepsilon_a A V^2}{2(T-x)^2} \quad (6)$$

where $\varepsilon_0$ is the vacuum permittivity, $\varepsilon_a$ the relative static permittivity (e.g. of air), A the area of the equal parallel reflectors, V the voltage applied between the electrodes, and x is displacement of the reflectors of the capacitor. Equation (6) applies for a MEMS parallel plate capacitor, as is explained for example in DOI:10.1557/PROC-782-A5.86.

The parameter T of equation (6) may be expressed as:

$$T = g - t d \left( 1 - \frac{\varepsilon_a}{\varepsilon_b} \right) \quad (7)$$

where g is the gap between the reflectors when no voltage is applied, and td is the thickness of the multilayer reflectors 104a,b provided on the electrode, with an relative static permittivity of εb.

Combining (6) and (5) into (4) provides:

$$-kx + \frac{\varepsilon_0 \varepsilon_a A V^2}{2(T-x)^2} = 0 \quad (8)$$

The capacitance of a capacitor (for a parallel plate capacitor formed from two multilayer reflectors) may be expressed as:

$$C = \frac{\varepsilon_0 A}{(g - x - t_d)/\varepsilon_a + t_d/\varepsilon_b} \quad (9)$$

An assumption can be made that the capacitance C is known (it may be measured by using an oscillator, capacitive coupling, or other method). Substituting (9) in (8) provides:

$$-kx + \frac{C^2 V^2}{2\varepsilon_0 \varepsilon_a A} = 0 \quad (10)$$

The relationship between the gap g between the reflectors and the transmission wavelength of the Fabry-Perot interferometer is has a linear proportional relationship:

$$g = a\lambda \quad (11)$$

The parameter a may be ½, 1, 2, 3, etc. (this may be referred to as the order of the cavity of the Fabry-Perot interferometer). Substituting (9) in (8) provides:

$$V = \left( \frac{2ka\lambda \varepsilon_0 \varepsilon_a A}{C^2} \right)^{1/2} \quad (12)$$

In equation (12) the parameters k, a, the dielectric constants, and the area of the reflectors do not vary with temperature (or they vary to such a small extent that their variation will not significantly affect measurement accuracy). These parameters can be defined as a constant:

$$B^2 = 2ka\varepsilon_0 \varepsilon_a A \quad (13)$$

which is independent of temperature.

This means that, if a measurement of the capacitance C has been obtained for the Fabry-Perot interferometer 104, and it is desired to transmit a wavelength λ, then the voltage that should be applied to transmit that wavelength is:

$$V = \frac{B\lambda_{1/2}}{C} \quad (1)$$

Importantly, this is independent of temperature of the Fabry-Perot interferometer 104. If the temperature of the Fabry-Perot interferometer 104 increases for example, and this causes the reflectors 104a,b of the Fabry-Perot interferometer to move further away from each other, then this will be captured by the measured capacitance C of the Fabry-Perot interferometer. Using the measured capacitance C when determining what voltage V to apply to the Fabry-Perot interferometer 104 automatically compensates for the effect of temperature variations.

A calibration measurement may be performed once the spectral sensor 100 has been fabricated, in order to determine the value of the constant B. Whether or not this is done may depend upon the desired wavelength accuracy of the spectral sensor 100. For example, in some applications an accuracy of +/−5 nm may be sufficient. In such a case a value of B determined for a representative spectral sensor 100 may be assumed to be the same for all spectral sensors having the same construction. A calibration may be performed for that representative spectral sensor, and the value B may then be used for other spectral sensors with the same construction. If higher accuracy is desired (e.g. to +/−1 nm) then a calibration to determine B may be performed for each spectral sensor 100.

FIG. 2 is a diagram which depicts electrical components 200 of the spectral sensor. The electrical components may be provided as one or more integrated circuits. A microcontroller 202 includes one or more central processing units (processor cores), a memory, and inputs and outputs. An output from the microcontroller 202 is connected via a digital to analog converter 204 to the Fabry-Perot interferometer 104. A voltage source (not depicted), which may be referred to as a boost convertor, provides a voltage to be supplied via the digital to analog converter 204 to the Fabry-Perot interferometer 104. A range of voltages applied to the Fabry-Perot interferometer 104 may for example be 0-100V. Other voltages may be applied.

A capacitance measurement circuit 205 (which may be referred to as a capacitance readout) is connected to the Fabry-Perot interferometer 104 and also connected to the microcontroller 202. The capacitance measurement circuit 205 may for example comprise an oscillator which applies a modulation to the capacitor and measures the effect of the capacitor on the modulation. The capacitance measurement circuit 205 measures the capacitance of the Fabry-Perot interferometer 104 and provides the measured capacitance to the microcontroller 202.

A thermistor 108 is connected via a first amplifier 206 to the microcontroller 202. The thermistor 108 provides a resistance value which is indicative of the temperature of the spectral sensor 100. This is passed via the first amplifier 206 to the microcontroller 202.

The microcontroller 202, taking into account the temperature as measured by the thermistor 108, may apply a modification to the value of the measured capacitance. This is because the capacitance measurement itself may be affected by the temperature of the spectral sensor. In one example, when an oscillator is used to measure the capacitance, for a given 'known' inductance L, the resonance frequency will drift because (apart from the capacitor) the inductance has a non-negligible temperature coefficient. The modification applied to the value of the measured capacitance may correct the measured capacitance to be the true capacitance of the Fabry-Perot interferometer. The microcontroller 202 uses the capacitance to determine what voltage to apply across the reflectors 104a,b of the Fabry-Perot interferometer 104 in order to transmit a desired wavelength (or range of wavelengths).

A signal corresponding to that voltage is provided to the digital to analog converter 204, which outputs the desired voltage (i.e. applies the desired voltage across the reflectors of the Fabry-Perot interferometer 104). A single voltage may be applied in order to detect a particular wavelength. Alternatively, a sweep through a voltage range may be applied in order to detect a range of wavelengths.

A photodiode 102 is connected via a second amplifier 208 to the microcontroller 202. The photodiode 102 provides an output which is proportional to the intensity of light which is incident upon it. The output is amplified by the second amplifier 208 and passes to the microcontroller 202

In some embodiments the microcontroller 202 may also be connected to a light emitter 212 via a driver 210. The light emitter 212 may for example be an incandescent bulb or other broadband light source. In such instances, the spectral sensor 100 together with the light emitter 212 may be considered to form a spectrometer. The light emitter 212 may for example be used to direct light into a sample, and the spectral sensor 100 may be used to detect light which is transmitted by a sample (absorbance spectroscopy), light which is fluorescently emitted by a sample (fluorescence spectroscopy), or other another optical property of the sample.

As explained above, the measured capacitance may be modified taking into account the measured temperature in order to provide a true capacitance. The true capacitance may be used to select the separation of the reflectors.

Although changes of the temperature of the Fabry-Perot interferometer may affect properties of the Fabry-Perot interferometer, embodiments of the invention are able to compensate for those changes when determining the voltage to be applied to the reflectors in order to transmit a desired wavelength. Consequently, post-measurement processing of measured intensity values to correct for temperature dependent effects may not be needed.

Figure 3:
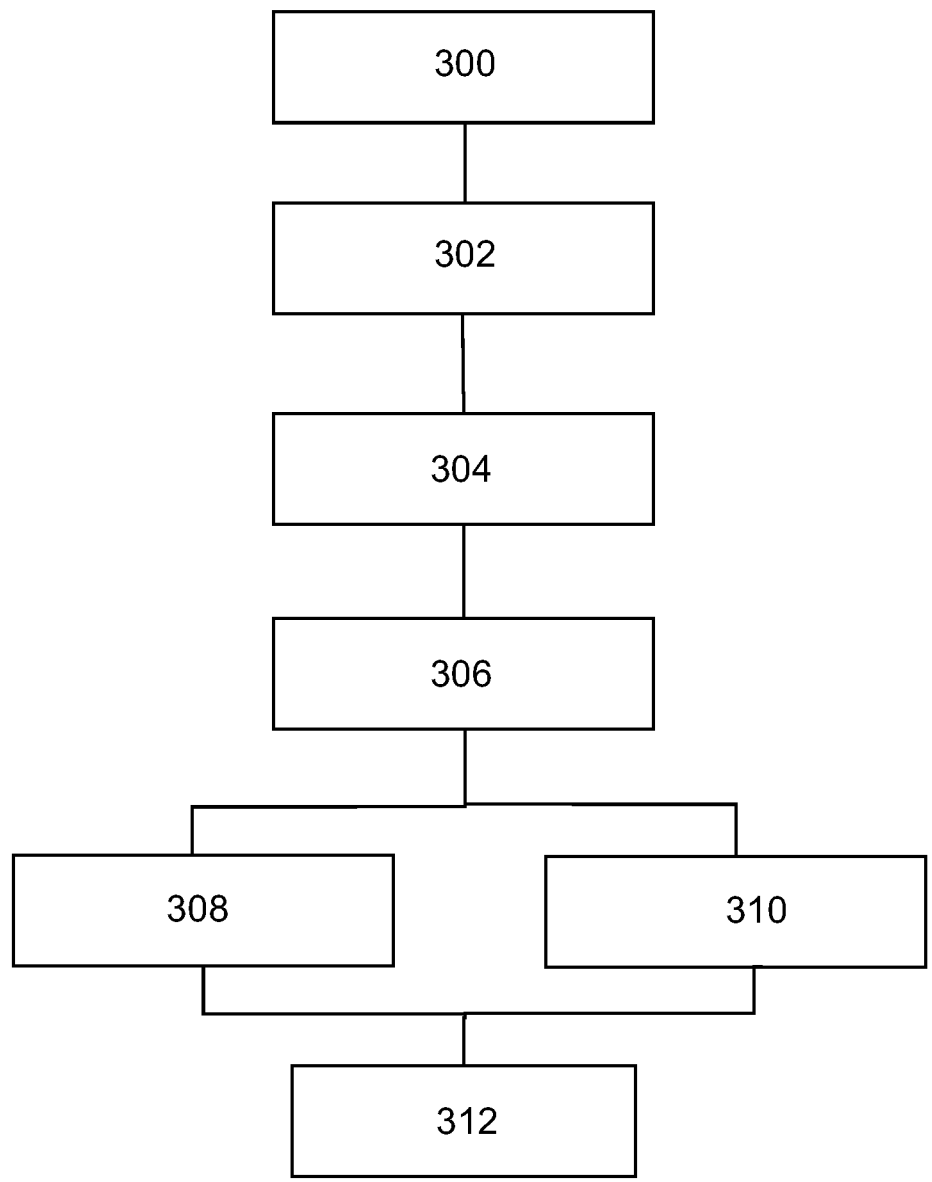
FIG. 3 is a flow chart which indicates a method of spectral sensing according to an embodiment of the disclosure.

FIG. 3 is a flow chart which illustrates operation of a spectral sensor according to the disclosure. A minimum wavelength and a maximum wavelength of the spectral measurement which is to be performed are known (they may for example be provided by a user and stored in a memory of the microcontroller 202). The start of the method is step 300. This includes setting a desired initial transmission wavelength to be the minimum wavelength. In embodiments in which a light emitter is provided, this step may include switching on the light emitter.

At step 302 the capacitance of the Fabry-Perot interferometer 104 is measured.

At step 304 the initial voltage that needs to be applied to the Fabry-Perot interferometer to transmit at the desired minimum transmission wavelength is determined using the measured capacitance.

At step 306 the initial voltage is applied across the reflectors of the Fabry-Perot interferometer 104.

At step 308 the intensity of light incident upon the photodetector 102 is measured and stored by the microcontroller 202. At the same time, at step 310 the voltage across the reflectors is ramped up until it reaches a voltage which corresponds with the desired maximum transmission wavelength. Light intensity as a function of wavelength is thereby measured and stored (a spectral measurement is performed).

The method then ends at step 312.

In some embodiments the capacitance may be measured again at the end of the spectral measurement. If the measured capacitance is different to the capacitance measured at the beginning of the measurement then this difference may be taken into account when recording detected light intensity as a function of wavelength (an adjustment may be applied to the recorded wavelengths).

In some embodiments the capacitance may be measured during the spectral measurement. More than one capacitance measurement may be performed during the spectral measurement. Again, if the measured capacitance is different to the capacitance measured at the beginning of the measurement (and/or at the end of the measurement) then this difference may be taken into account when recording detected light intensity as a function of wavelength (an adjustment may be applied to the recorded wavelengths).

When it is next desired to perform a subsequent measurement using the spectral sensor, the capacitance may be measured again before the measurement is performed. However, if no significant change of capacitance is expected, e.g. because the temperature of the spectral sensor has not changed, then the capacitance measurement may be omitted.

In general, capacitance measurements may be performed when it appears necessary to do so, taking into account a desired measurement accuracy and changes of the temperature of the spectral sensor. For example, a spectral measurement may be performed once per day to prevent drift due to temperature change, or at some other time interval.

Measurements of light intensity as a function of wavelength may be stored in the memory of the microcontroller 202.

In the above example the wavelength is scanned upwards. However, the wavelength may be scanned downwards. Alternatively, one or more measurements of discrete wavelengths may be performed.

In the described embodiments the reflectors 104a,b are conductive. However, the reflectors do not need to be conductive. If the reflectors are not conductive then a layer of conductor may be provided for each reflector (e.g. between the reflector and a substrate or other structure which supports the reflector). In such a situation, the capacitance of the Fabry-Perot interferometer derives from the conductor layers and not from the reflectors.

Embodiments of the invention may be configured to measure at infra-red wavelengths. For example, a measurement range of 1350 nm to 1650 nm, or 1550 nm to 1850 nm. In general measurements between 1300 nm and 1900 nm may be performed. Embodiments of the invention may be configured to measure at other wavelengths.

Although the described embodiments refer to a microcontroller, this is merely an example. Any form of controller may be used.

Features disclosed in connection with one embodiment of the invention may be used with other embodiments of the invention.

LIST OF REFERENCE NUMERALS

100—Spectral sensor
102—Photodetector
103—Substrate
104—Fabry Perot Interferometer
104a—First reflector 104b—Second reflector
105—Recess
106—Supports
107—Layer
108—Thermistor
112—Substrate
114—Control electronics
116—Housing
118—Opening
120—Window
200—Electrical components
202—Microcontroller
204—Digital to analog convertor
205—Capacitance measurement circuit
206—First amplifier
208—Second amplifier
300—Start (set initial transmission wavelength)
302—Capacitance measurement
304—Determine initial voltage
306—Apply initial voltage
308—Measure and store light intensity
310—Ramp voltage across reflectors
312—End The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A spectral sensor comprising:
    a Fabry-Perot interferometer having a pair of reflectors, a photodetector located beneath the Fabry-Perot interferometer;
    a capacitance measurement circuit configured to measure a capacitance of the Fabry-Perot interferometer;
    a thermistor configured to detect a temperature of the spectral sensor; and
    a controller configured to control a voltage applied across the reflectors of the Fabry-Perot interferometer;
    wherein the controller is configured to receive a measured temperature from the thermistor and a measured capacitance, determine a true capacitance by modifying the measured capacitance taking into account the measured temperature, use the true capacitance to determine the voltage to be applied to the reflectors, and transmit a desired wavelength, based on the voltage determined by the true capacitance, that does not vary with changes in temperature;
    wherein a temperature invariant constant of the capacitor formed by the Fabry-Perot interferometer is stored in a memory of the spectral sensor and is used when determining the voltage to apply across the reflectors of the Fabry-Perot interferometer; and
    wherein the temperature invariant constant of the capacitor is a value which has been measured for that spectral sensor following fabrication of the spectral sensor.

2. The spectral sensor of claim 1, wherein the reflectors are conductors.

3. The spectral sensor of claim 1, wherein the reflectors are multilayer structures.

4. The spectral sensor of claim 1, wherein the controller is configured to:
    receive the measured capacitance of the Fabry-Perot interferometer, and
    to use the measured capacitance to determine the voltage applied to the Fabry-Perot interferometer in order to transmit a desired wavelength.

5. The spectral sensor of claim 1, wherein the Fabry-Perot interferometer comprises:
    a substrate provided with a recess having a planar bottom; and
    a layer which extends over the recess.

6. The spectral sensor of claim 5, wherein one reflector of the pair of reflectors is provided on the planar bottom, and the other reflector is provided on a surface of the layer which faces the planar bottom.

7. The spectral sensor of claim 1, wherein the spectral sensor does not include a processor configured to perform post-measurement processing of measured intensity values to correct for temperature dependent effects.

8. A spectrometer comprising the spectral sensor of claim 1, and further comprising a light source.

9. A method of spectral measurement using a Fabry-Perot interferometer which includes a pair of reflectors, and a photodetector located beneath the Fabry-Perot interferometer, the method comprising:
    measuring the capacitance of the Fabry-Perot interferometer;
    measuring, via a thermistor, a temperature of the spectral sensor;
    applying a voltage across the reflectors of the Fabry-Perot interferometer to select a separation of the reflectors which transmits a desired wavelength, the voltage being determined based upon the measured capacitance;
    measuring the intensity of light incident upon the photodetector;
    determine a true capacitance by modifying the measured capacitance taking into account the measured temperature, wherein the true capacitance is used to select the separation of the reflectors;
    determine the voltage to apply across the reflectors of the Fabry-Perot interferometer based on the true capacitance; and
    transmit a desired wavelength, based on the voltage determined by the true capacitance, that does not vary with changes in temperature;
    wherein the temperature invariant constant of the capacitor is a value which has been measured for that spectral sensor following fabrication of the spectral sensor.

10. The method of claim 9, wherein the voltage is scanned from a minimum desired voltage to a maximum desired voltage, or from a maximum desired voltage to a minimum desired voltage, in order to obtain measurements across a desired range of wavelengths.

11. The method of claim 9, wherein the capacitance is measured before each spectral measurement.

12. The method of claim 9, wherein the capacitance is measured after each spectral measurement.

13. The method of claim 9, wherein the capacitance is measured during each spectral measurement.

14. The method of claim 9, wherein the capacitance is measured after a predetermined time and/or after a predetermined change of temperature of the spectral sensor.

15. The method of any of claim 9, wherein post-measurement processing of measured intensity values to correct for temperature dependent effects is not performed.

* * * * *